(12) United States Patent
Bhowmik et al.

(10) Patent No.: US 12,313,762 B2
(45) Date of Patent: May 27, 2025

(54) SYSTEMS AND METHODS FOR LOCATING MOBILE ELECTRONIC DEVICES WITH EAR-WORN DEVICES

(71) Applicant: Starkey Laboratories, Inc., Eden Prairie, MN (US)

(72) Inventors: Achintya Kumar Bhowmik, Cupertino, CA (US); Amit Shahar, Hod HaSharon (IL); Majd Srour, Nesher (IL); Dagan Shtifman, Hod HaSharon (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 346 days.

(21) Appl. No.: 17/791,446

(22) PCT Filed: Jan. 8, 2021

(86) PCT No.: PCT/US2021/012736
§ 371 (c)(1),
(2) Date: Jul. 7, 2022

(87) PCT Pub. No.: WO2021/142290
PCT Pub. Date: Jul. 15, 2021

(65) Prior Publication Data
US 2023/0051613 A1 Feb. 16, 2023

Related U.S. Application Data

(60) Provisional application No. 62/959,294, filed on Jan. 10, 2020.

(51) Int. Cl.
*G01S 5/18* (2006.01)
*G08B 21/24* (2006.01)
*H04M 1/72412* (2021.01)

(52) U.S. Cl.
CPC .............. *G01S 5/183* (2013.01); *G08B 21/24* (2013.01); *H04M 1/72412* (2021.01)

(58) Field of Classification Search
CPC ...... G01S 13/765; G01S 5/183; G01S 5/0295; H04M 1/6066; H04M 1/72412; G01C 21/206; G08B 21/24
(Continued)

(56) References Cited

U.S. PATENT DOCUMENTS 6,181,956 B1 * 1/2001 Koskan .................... H04B 1/38
455/66.1
9,167,356 B2 10/2015 Higgins et al.
(Continued)

FOREIGN PATENT DOCUMENTS

EP 3430817 6/2020
WO WO-2004071113 A1 * 8/2004 ............... G08B 6/00
(Continued)

OTHER PUBLICATIONS

"International Preliminary Report on Patentability," for PCT Application No. PCT/US2021/012736 mailed Jul. 21, 2022 (12 pages).
(Continued)

*Primary Examiner* — Daniel L Murphy
*Assistant Examiner* — Amie M Ndure
(74) *Attorney, Agent, or Firm* — Pauly, DeVries Smith & Deffner LLC

(57) ABSTRACT

Embodiments herein relate to ear-worn devices that can be used to locate other devices such as mobile electronic devices. In a first aspect, an ear-worn device is included having a control circuit, a microphone in electrical communication with the control circuit, an electroacoustic transducer for generating sound in electrical communication with the control circuit, a motion sensor in electrical communication with the control circuit, and a power supply circuit in
(Continued)

electrical communication with the control circuit, wherein the ear-worn device is configured to issue a location command to a mobile electronic device and wherein the location command triggers the mobile electronic device to emit a locating signal. Other embodiments are also included herein.

20 Claims, 12 Drawing Sheets

(58) Field of Classification Search
USPC .......................................................... 367/118
See application file for complete search history.

(56) References Cited

U.S. PATENT DOCUMENTS

| | | | |
|---|---|---|---|
| 9,848,273 | B1 | 12/2017 | Helwani et al. |
| 10,455,333 | B2 | 10/2019 | Dickmann et al. |
| 10,733,334 | B2* | 8/2020 | Santarone ............... G06T 7/001 |
| 2004/0203651 | A1* | 10/2004 | Qu .................... H04M 1/72403 |
| | | | 455/414.1 |
| 2007/0071262 | A1* | 3/2007 | Rass ..................... H04R 25/70 |
| | | | 381/309 |
| 2018/0317837 | A1* | 11/2018 | Burwinkel .............. G06F 3/012 |
| 2019/0028843 | A1* | 1/2019 | Santarone ............ G01C 21/367 |
| 2019/0171780 | A1* | 6/2019 | Santarone .......... G02B 27/0093 |
| 2019/0347368 | A1* | 11/2019 | Duff .................... G02B 27/0172 |
| 2020/0034501 | A1* | 1/2020 | Duff ...................... G06T 19/006 |
| 2020/0196977 | A1* | 6/2020 | Martin ................. A61B 5/7203 |
| 2021/0306771 | A1* | 9/2021 | El Guindi .............. A61B 5/053 |
| 2022/0272465 | A1* | 8/2022 | Boldt .................... A61B 5/165 |

FOREIGN PATENT DOCUMENTS

| | | | |
|---|---|---|---|
| WO | 2006085171 | 8/2006 | |
| WO | WO-2006085171 A1 * | 8/2006 | .......... H04M 1/6066 |
| WO | 2021142290 | 7/2021 | |

OTHER PUBLICATIONS

"International Search Report and Written Opinion," for PCT Application No. PCT/US2021/012736 mailed Jul. 8, 2021 (17 pages).

"Invitation to Pay Additional Fees," for PCT Application No. PCT/US2021/012736 mailed May 17, 2021 (14 pages).

"Communication Pursuant to Article 94(3) EPC," for European Patent Application No. 21705298.4 mailed Apr. 18, 2024 (4 pages).

* cited by examiner

SYSTEMS AND METHODS FOR LOCATING MOBILE ELECTRONIC DEVICES WITH EAR-WORN DEVICES

This application is being filed as a PCT International Patent application on Jan. 8, 2021, in the name of Starkey Laboratories, Inc., a U.S. national corporation, applicant for the designation of all countries, and Achintya Kumar Bhowmik, a U.S. Citizen, and Amit Shahar, a U.S. Citizen, and Majd Srour, a Citizen of Israel, and Dagan Shtifman, a Citizen of Israel, inventor(s) for the designation of all countries, and claims priority to U.S. Provisional Patent Application No. 62/959,294, filed Jan. 10, 2020, the contents of which are herein incorporated by reference in its entirety.

FIELD

Embodiments herein relate to ear-worn devices that can be used to locate other devices such as mobile electronic devices.

BACKGROUND

Personal mobile electronic devices such as smart phones have become ubiquitous and provide various functions including communication, information retrieval, navigation, shopping, and the like. Individuals have come to rely on them and other mobile electronic devices to a great extent. As a result, misplacing such devices can create substantial inconvenience and distress. Finding misplaced devices can sometimes be quite difficult.

SUMMARY

Embodiments herein relate to ear-worn devices that can be used to locate other devices such as mobile electronic devices. In a first aspect, an ear-worn device is included having a control circuit, a microphone in electrical communication with the control circuit, an electroacoustic transducer for generating sound in electrical communication with the control circuit, a motion sensor in electrical communication with the control circuit, and a power supply circuit in electrical communication with the control circuit, wherein the ear-worn device is configured to issue a location command to a mobile electronic device and wherein the location command triggers the mobile electronic device to emit a locating signal.

In a second aspect, in addition to one or more of the preceding or following aspects, or in the alternative to some aspects, the locating signal can include a sound at an audible frequency.

In a third aspect, in addition to one or more of the preceding or following aspects, or in the alternative to some aspects, the locating signal can include a sound an inaudible frequency.

In a fourth aspect, in addition to one or more of the preceding or following aspects, or in the alternative to some aspects, the locating signal can include a visual output.

In a fifth aspect, in addition to one or more of the preceding or following aspects, or in the alternative to some aspects, the locating signal can include a vibration.

In a sixth aspect, in addition to one or more of the preceding or following aspects, or in the alternative to some aspects, the locating signal can include a geospatial location bearing electronic communication.

In a seventh aspect, in addition to one or more of the preceding or following aspects, or in the alternative to some aspects, the geospatial location is a current geospatial location of the mobile electronic device.

In an eighth aspect, in addition to one or more of the preceding or following aspects, or in the alternative to some aspects, the geospatial location can include geospatial coordinates.

In a ninth aspect, in addition to one or more of the preceding or following aspects, or in the alternative to some aspects, the geospatial location can include a triangulated location.

In a tenth aspect, in addition to one or more of the preceding or following aspects, or in the alternative to some aspects, the locating signal can include a referential location.

In an eleventh aspect, in addition to one or more of the preceding or following aspects, or in the alternative to some aspects, the referential location can include a beacon reference.

In a twelfth aspect, in addition to one or more of the preceding or following aspects, or in the alternative to some aspects, the referential location can include a specific room.

In a thirteenth aspect, in addition to one or more of the preceding or following aspects, or in the alternative to some aspects, the referential location can include an associated device reference.

In a fourteenth aspect, in addition to one or more of the preceding or following aspects, or in the alternative to some aspects, the referential location can include a recognized sound field reference.

In a fifteenth aspect, in addition to one or more of the preceding or following aspects, or in the alternative to some aspects, the locating signal can include a vertical dimension.

In a sixteenth aspect, in addition to one or more of the preceding or following aspects, or in the alternative to some aspects, the ear-worn device is configured to guide an ear-worn device wearer to the mobile electronic device based on the locating signal.

In a seventeenth aspect, in addition to one or more of the preceding or following aspects, or in the alternative to some aspects, the ear-worn device is configured to guide the ear-worn device wearer using a virtual 3-D audio interface.

In an eighteenth aspect, in addition to one or more of the preceding or following aspects, or in the alternative to some aspects, the ear-worn device is configured to guide the ear-worn device wearer including directions relative to a directional position of the ear-worn device wearer's head.

In a nineteenth aspect, in addition to one or more of the preceding or following aspects, or in the alternative to some aspects, the ear-worn device is configured to guide the ear-worn device wearer including step-by-step directions.

In a twentieth aspect, in addition to one or more of the preceding or following aspects, or in the alternative to some aspects, guidance changes can be provided and based on proximity to the mobile electronic device.

In a twenty-first aspect, in addition to one or more of the preceding or following aspects, or in the alternative to some aspects, wherein guidance changes include one or more of pitch changes, volume changes, and frequency of modulation changes.

In a twenty-second aspect, in addition to one or more of the preceding or following aspects, or in the alternative to some aspects, wherein the ear-worn device is configured to guide an ear-worn device wearer to a projected location of the mobile electronic device based on a stored location of the mobile electronic device.

In a twenty-third aspect, in addition to one or more of the preceding or following aspects, or in the alternative to some aspects, the ear-worn device can be configured to receive an initiation command from the ear-worn device wearer prior to issuing the location command.

In a twenty-fourth aspect, in addition to one or more of the preceding or following aspects, or in the alternative to some aspects, the initiation command can include a voice command.

In a twenty-fifth aspect, in addition to one or more of the preceding or following aspects, or in the alternative to some aspects, the initiation command can include at least one of a button press, a swipe, a tap, a haptic input, or a gesture.

In a twenty-sixth aspect, in addition to one or more of the preceding or following aspects, or in the alternative to some aspects, wherein the location command is conveyed over a wireless network.

In a twenty-seventh aspect, in addition to one or more of the preceding or following aspects, or in the alternative to some aspects, wherein the location command is an acoustic signal.

In a twenty-eighth aspect, in addition to one or more of the preceding or following aspects, or in the alternative to some aspects, wherein the location command is issued directly to the mobile electronic device.

In a twenty-ninth aspect, in addition to one or more of the preceding or following aspects, or in the alternative to some aspects, wherein the location command is issued indirectly to the mobile electronic device.

In a thirtieth aspect, in addition to one or more of the preceding or following aspects, or in the alternative to some aspects, wherein the ear-worn device is configured to access a stored location of the mobile electronic device if a locating signal is not received with a time period after issuing a location command to a mobile electronic device.

In a thirty-first aspect, in addition to one or more of the preceding or following aspects, or in the alternative to some aspects, wherein the ear-worn device is configured to periodically receive locating signals from the mobile electronic device and store location aspects of the same.

In a thirty-second aspect, in addition to one or more of the preceding or following aspects, or in the alternative to some aspects, wherein the ear-worn device is configured to compute a projected location of the mobile electronic device if a locating signal is not received after issuing a location command to a mobile electronic device.

In a thirty-third aspect, in addition to one or more of the preceding or following aspects, or in the alternative to some aspects, the projected location can be determined based on factors including a current time of day.

In a thirty-fourth aspect, in addition to one or more of the preceding or following aspects, or in the alternative to some aspects, the projected location can be determined based on factors including recorded sleep/wake patterns of the ear-worn device wearer.

In a thirty-fifth aspect, in addition to one or more of the preceding or following aspects, or in the alternative to some aspects, the projected location can be determined based on factors including recorded movement patterns of the ear-worn device wearer.

In a thirty-sixth aspect, in addition to one or more of the preceding or following aspects, or in the alternative to some aspects, the projected location can be determined based on factors including recorded activity patterns of the ear-worn device wearer.

In a thirty-seventh aspect, in addition to one or more of the preceding or following aspects, or in the alternative to some aspects, wherein the ear-worn device is configured to issue a location command to a secondary device if a locating signal is not received within a time period after issuing a location command to a mobile electronic device.

In a thirty-eighth aspect, in addition to one or more of the preceding or following aspects, or in the alternative to some aspects, wherein the ear-worn device is configured to play sounds recorded at a previous time the mobile electronic device was in communication with the ear-worn device if a locating signal is not received with a time period after issuing a location command to a mobile electronic device.

In a thirty-ninth aspect, in addition to one or more of the preceding or following aspects, or in the alternative to some aspects, the mobile electronic device can include a personal communications device.

In a fortieth aspect, in addition to one or more of the preceding or following aspects, or in the alternative to some aspects, the mobile electronic device can include a smart phone.

In a forty-first aspect, a method of locating a mobile electronic device can include issuing a location command to a mobile electronic device using an ear-worn device, waiting to receive a locating signal from the mobile electronic device with the ear-worn device, guiding a device wearer to a location of the mobile electronic device using the ear-worn device.

In a forty-second aspect, in addition to one or more of the preceding or following aspects, or in the alternative to some aspects, wherein the locating signal contains a location of the mobile electronic device.

In a forty-third aspect, in addition to one or more of the preceding or following aspects, or in the alternative to some aspects, wherein the location of the mobile electronic device is at least one of a geospatial location, a stored location, or a projected location.

In a forty-fourth aspect, in addition to one or more of the preceding or following aspects, or in the alternative to some aspects, a method further can include calculating a projected location using at least one of a current time of day, recorded sleep/wake patterns of the device wearer, recorded movement patterns of the device wearer, recorded activity patterns of the device wearer.

In a forty-fifth aspect, in addition to one or more of the preceding or following aspects, or in the alternative to some aspects, a method further can include issuing a location command to a secondary device if a locating signal is not received within a time period after issuing a location command to a mobile electronic device.

In a forty-sixth aspect, in addition to one or more of the preceding or following aspects, or in the alternative to some aspects, a method further can include playing sounds recorded at a previous time the mobile electronic device was in communication with the ear-worn device if a locating signal is not received with a time period after issuing a location command to a mobile electronic device.

In a forty-seventh aspect, in addition to one or more of the preceding or following aspects, or in the alternative to some aspects, a method further can include guiding an ear-worn device wearer to the mobile electronic device based on the locating signal.

In a forty-eighth aspect, in addition to one or more of the preceding or following aspects, or in the alternative to some aspects, wherein guiding includes guiding using a virtual 3-D audio interface.

In a forty-ninth aspect, in addition to one or more of the preceding or following aspects, or in the alternative to some aspects, wherein guiding includes providing directions relative to a directional position of the device wearer's head.

In a fiftieth aspect, in addition to one or more of the preceding or following aspects, or in the alternative to some aspects, wherein guiding includes providing step-by-step directions.

In a fifty-first aspect, in addition to one or more of the preceding or following aspects, or in the alternative to some aspects, a method further can include guiding an ear-worn device wearer to a projected location of the mobile electronic device based on a stored location of the mobile electronic device.

In a fifty-second aspect, in addition to one or more of the preceding or following aspects, or in the alternative to some aspects, a method further can include receiving an initiation command from the ear-worn device wearer prior to issuing the location command.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As referenced above, personal devices such as smart phones are heavily relied upon and misplacing such devices can create substantial inconvenience and distress. Finding misplaced devices can sometimes be quite difficult.

Embodiments herein include ear-worn devices that can be used to help ear-worn device wearers locate mobile electronic devices such as smart phones. In some embodiments, an ear-worn device herein includes a control circuit, a microphone in electrical communication with the control circuit, an electroacoustic transducer for generating sound in electrical communication with the control circuit, a motion sensor in electrical communication with the control circuit, and a power supply circuit in electrical communication with the control circuit. The ear-worn device can be configured to issue a location command to a mobile electronic device, wherein the location command triggers the mobile electronic device to emit a locating signal. The locating signal can then be used to help locate the mobile electronic device. In some embodiments, if a locating signal is not received from the mobile electronic device (such as if the mobile electronic device has been turned off or it otherwise not responsive or didn't receive the location command) then the ear-worn device can guide the device wearer to a previous location of the mobile electronic device and/or a projected location of the mobile electronic device.

Figure 1:
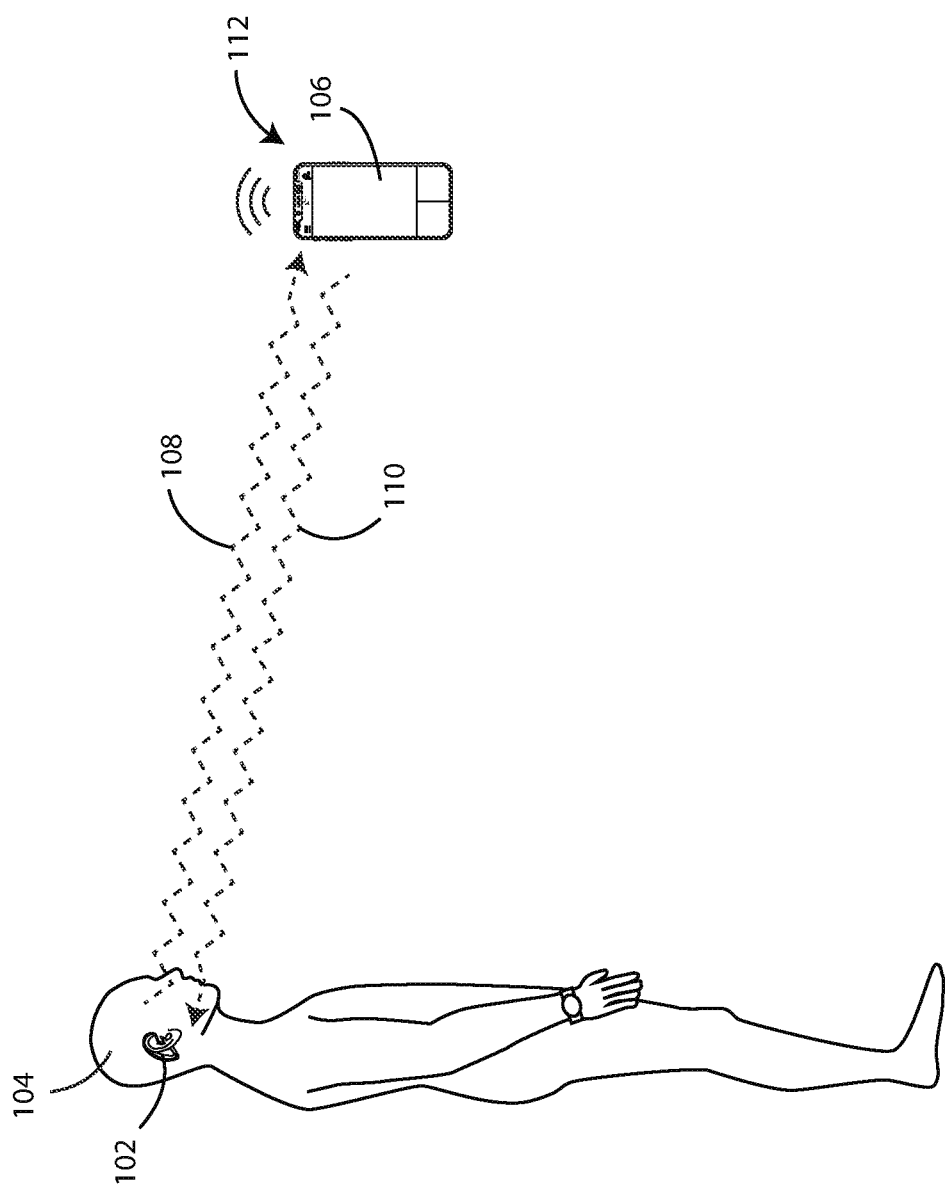
FIG. 1 is a schematic view of components of a system in accordance with various embodiments herein.

Referring now to FIG. 1, a schematic view is shown of components of a system in accordance with various embodiments herein. FIG. 1 shows an ear-worn device wearer 104 that is wearing an ear-worn device 102. FIG. 1 also shows a mobile electronic device 106. The ear-worn device 102 can issue a location command 108 directed to a mobile electronic device 106. The mobile electronic device 106 can receive the location command 108 and can issue a locating signal 110. Thus, in various embodiments, the location command 108 triggers the mobile electronic device 106 to emit a locating signal 110.

The location command 108 can be conveyed in various ways including both wireless and wired modalities and can take various forms. In some embodiments the location command 108 can be conveyed as a wireless signal using a standard wireless protocol (such as WIFI, BLUETOOTH, BLUETOOTH LE, or the like) or a custom wireless protocol. In some embodiments the location command 108 can be conveyed over a wireless data network. In some embodiments the location command 108 can be conveyed over a packet switched network. In some embodiments, the location command 108 can include or be an advertising packet or transmission. In various embodiments, the location command can include an identifier unique to the mobile electronic device which is being sought such as a MAC address or another unique identifier and a flag or code indicating that a locating signal 110 is being requested.

In some embodiments, the location command 108 can be an acoustic signal. The acoustic signal can be at frequencies within normal human hearing ranges (e.g., human audible) and/or can be at higher or lower (e.g., human inaudible) frequencies. While not intending to be bound by theory, transmitting an acoustic signal at human inaudible frequencies can allow for higher power transmissions without disturbing people that may be nearby and/or allowing the transmission to be discrete In various embodiments, a location command 108 can be issued directly to the mobile electronic device 106. However, in other embodiments, the location command 108 can be issued indirectly to the mobile electronic device 106 (such as being forwarded through other devices first, through a mesh network, or the like).

In various embodiments herein, the ear-worn device 102 can provide guidance to the device wearer 104. For example, in various embodiments, the ear-worn device 102 can be configured to guide an ear-worn device wearer 104 to the mobile electronic device 106 based on the locating signal 110. In various embodiments, the ear-worn device 102 can be configured to guide the ear-worn device wearer 104 using a virtual 3-D audio interface. In various embodiments, the ear-worn device 102 can be configured to guide an ear-worn device wearer 104 to an actual location of the mobile electronic device 106.

In various embodiments, the ear-worn device 102 can be configured to guide an ear-worn device wearer 104 to a previous location and/or a projected location (described further below) of the mobile electronic device 106. For example, in various embodiments, the ear-worn device 102 can be configured to access a stored location of the mobile electronic device 106 if a locating signal 110 is not received back with a fixed time period after issuing a location command 108 to a mobile electronic device 106 to be able to guide the device wearer to a previous location of the mobile electronic device 106. By way of example, the time period (or time out period) can be about 0.5, 1, 2, 3, 5, 10, 15 or 30 seconds or more, or an amount of time falling within a range between any of the foregoing. In various embodiments, the ear-worn device 102 can be configured to periodically receive locating signals from the mobile electronic device 106 (with or without a location command being sent first) and store aspects of the same in memory, such as storing a location and a time stamp. In this way, the ear-worn device 102 can maintain a record of recent locations of the mobile electronic device 106.

In various embodiments, the ear-worn device 102 can be configured to compute a projected location (described further below) of the mobile electronic device 106 if a locating signal 110 is not received (such as after a time-out period) after issuing a location command 108 to a mobile electronic device 106. By way of example, the time period (or time out period) can be about 0.5, 1, 2, 3, 5, 10, 15 or 30 seconds or more, or an amount of time falling within a range between any of the foregoing.

In various embodiments, the ear-worn device 102 can be configured to play sounds recorded the last time the mobile electronic device 106 was in communication with the ear-worn device 102 if a locating signal 110 is not received with a time period after issuing a location command 108 to a mobile electronic device 106. The recorded sounds can be enough to jog the memory of the device-wearer to help them remember where they left the mobile electronic device. For example, perhaps the device-wearer was in their living room with the TV the last time the mobile electronic device was in communication with the ear-worn device(s). In that case, the recorded sounds can include sounds from the TV that will cause the device wearer to remember the living room as the possible location where they left their mobile electronic device. As another example, perhaps they were talking to another person the last time the mobile electronic device was in communication with the ear-worn device(s). In that case, the recorded sounds can include sounds of the person they were talking to that will cause the device wearer to remember the possible location where they left their mobile electronic device. The recorded sounds can be about 0.5, 1, 2, 3, 5, 10, 15, 30, 60 seconds or more, or an amount of time falling within a range between any of the foregoing.

In various embodiments, the location command 108 can be directed to a secondary device if a locating signal 110 is not received within a time period after issuing a location command 108 to a mobile electronic device 106. The secondary device can be used to forward the location command. In some embodiments the secondary device can be used to access a previous location of the mobile electronic device and/or calculate a projected location of the mobile electronic device.

In some cases, the locating signal 110 can include a geospatial location 112 of the mobile electronic device 106, such as location coordinates with or without an altitude component. In various embodiments, the locating signal 110 can include a geospatial location bearing electronic communication. In various embodiments, the geospatial location can be a current geospatial location 112 of the mobile electronic device 106, a previous geospatial location of the mobile electronic device 106, or a projected geospatial location of the mobile electronic device 106. In various embodiments, the geospatial location can include geospatial coordinates with or without an altitude component.

The mobile electronic device 106 can take on many different forms. In some embodiments, the mobile electronic device 106 can be a personal communications device. In various embodiments, the mobile electronic device 106 can be a smart phone. In some embodiments, the mobile electronic device 106 can be another type of electronic device.

Figure 2:
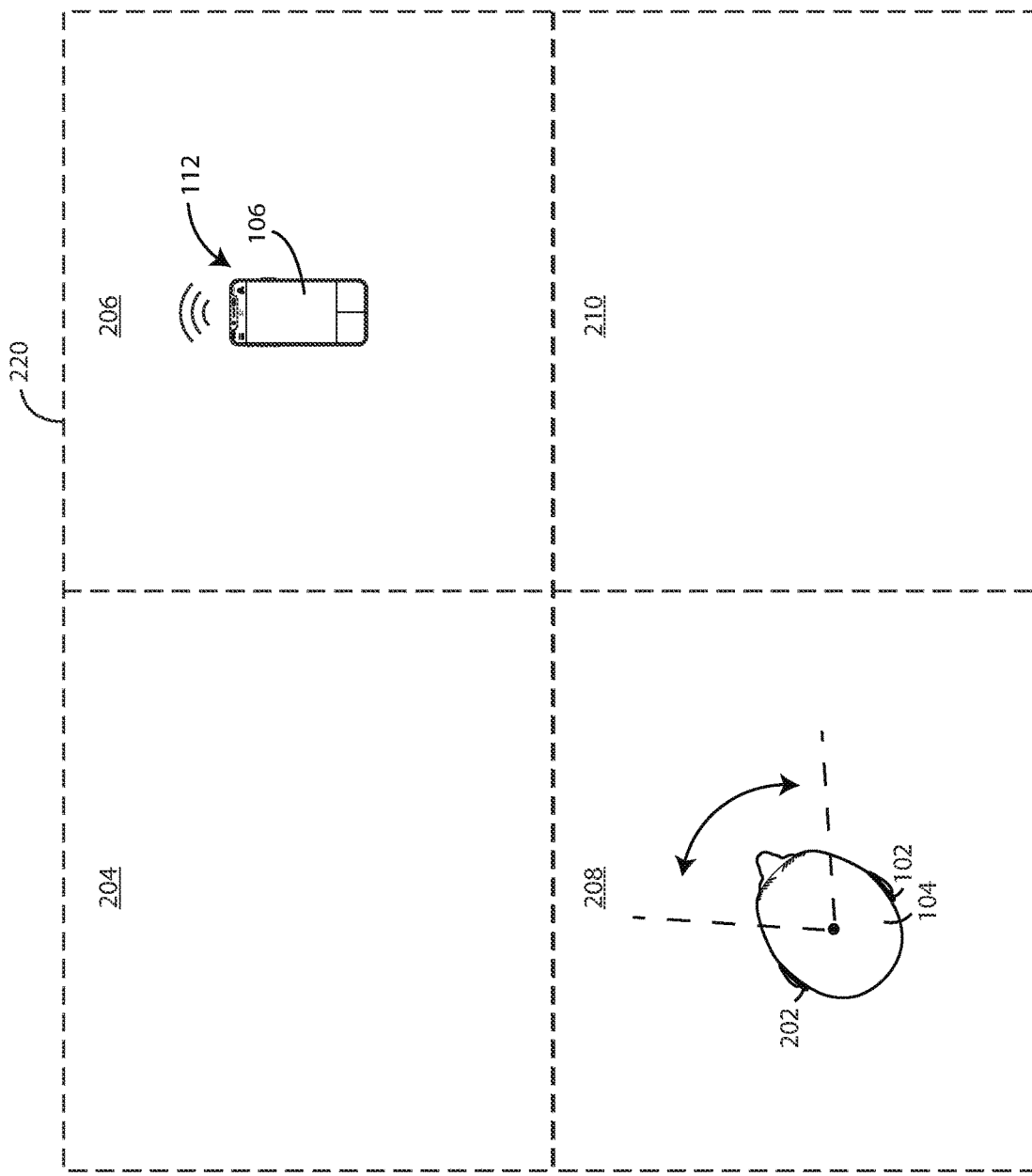
FIG. 2 is a schematic view of ear-worn devices being used to locate a mobile electronic device in accordance with various embodiments herein.

As referenced above, in various embodiments the ear-worn device 102 can be configured to guide an ear-worn device wearer to an actual location of the mobile electronic device. In some embodiments, this can include determining a present location of the device-wearer and then calculating a route for the device-wearer to follow to get to the location of the mobile electronic device (the actual location, previous location, projected location, or the like). Referring now to FIG. 2, a schematic view of ear-worn devices 102, 202 being used to locate a mobile electronic device 106 is shown in accordance with various embodiments herein. One or both of ear-worn devices 102, 202 receive a locating signal including a current geospatial location 112. One or both of ear-worn devices 102, 202 can then provide guidance to the ear-worn device wearer 104. FIG. 2 shows an area 220. The area 220 includes a first zone 204, second zone 206, third zone 208, and fourth zone 210. In this case, the current geospatial location 112 of the mobile electronic device 106 is in the second zone 206. It will be appreciated that while four zones are shown in FIG. 2, a given area may have any number of zones such as 1, 2, 4, 8, 15, 30, 60, 120, or more. The zones are not particularly limited to a specific size but can vary based on the known accuracy of the geospatial location of the mobile electronic device. By way of example, the zones can be about 0.1, 0.5, 1, 2, 5, 10 or more square meters or an amount falling within a range between any of the foregoing.

In various embodiments, the ear-worn device 102 can be configured to guide the ear-worn device wearer 104 including directions relative to the directional position of the device wearer's head. For example, one or both of the ear-worn devices 102, 202 can provide an instruction, such as "turn 45 degrees right and move ahead about 5 feet" or "move straight ahead about 10 feet". In various embodiments, the ear-worn device 102 can be configured to guide the ear-worn device wearer 104 including step-by-step directions. For example, the ear-worn device 102 can issue a series of directions such as "go forward 8 feet, then turn right 90 degrees, then go forward 5 feet and look down".

In various embodiments, the system can be triggered to begin to assist in locating a mobile electronic device (such as by issuing a location command) after receiving an initiation command from the ear-worn device wearer. The initiation command can take various forms. In some embodiments, the initiation command can be a spoken command detected by the ear-worn device(s) (e.g., a voice command such as "please find my phone"). In some embodiments, the initiation command can be a button press, such as the device wearer pressing a button on the ear-worn device(s). In some embodiments the initiation command can be at least one of a button press, a swipe, a tap, a haptic input, or a gesture.

Figure 3:
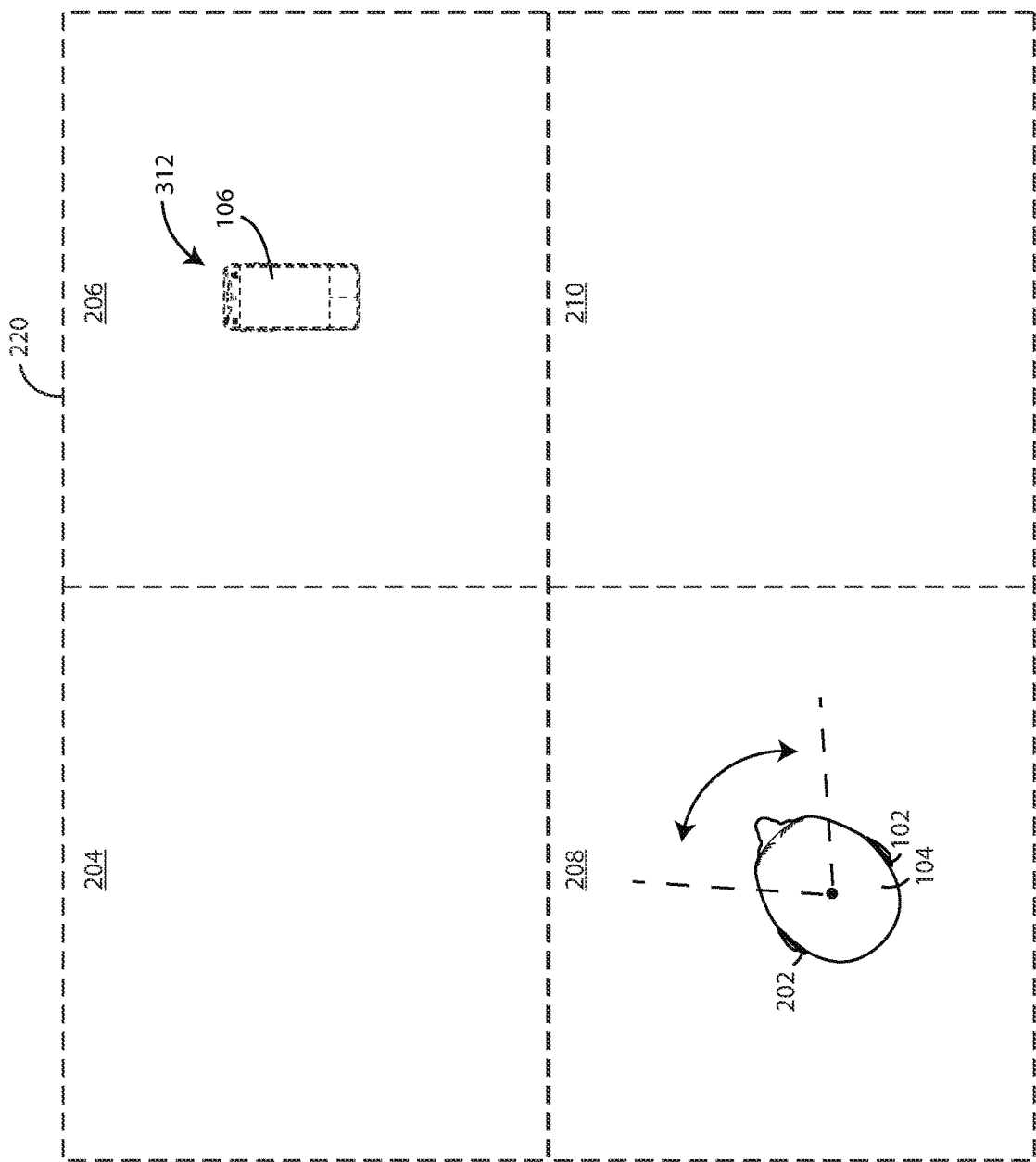
FIG. 3 is a schematic view of ear-worn devices being used to locate a mobile electronic device in accordance with various embodiments herein.

In some cases, the ear-worn device(s) can guide an ear-worn device wearer to a previous location or a projected location of the mobile electronic device. Referring now to FIG. 3, a schematic view of ear-worn devices 102, 202 being used to locate a mobile electronic device 106 is shown in accordance with various embodiments herein. In various embodiments, the ear-worn devices 102, 202 can guide the device wearer 104 to a projected location 312 of the mobile electronic device 106 if a locating signal 110 is not received from the mobile electronic device 106 after the ear-worn devices 102, 202 issue a location command 108. As with FIG. 2, FIG. 3 shows an area 220. The area 220 includes a first zone 204, second zone 206, third zone 208, and fourth zone 210.

In various embodiments, the ear-worn device 102 can be configured to guide an ear-worn device wearer 104 to the projected location 312 of the mobile electronic device 106 based, at least in part, on a stored location of the mobile electronic device 106. In various embodiments, the ear-worn device 102 can be configured to access a stored location of the mobile electronic device 106 if a locating signal 110 can be not received with a time period after issuing a location command 108 to a mobile electronic device 106.

Figure 4:
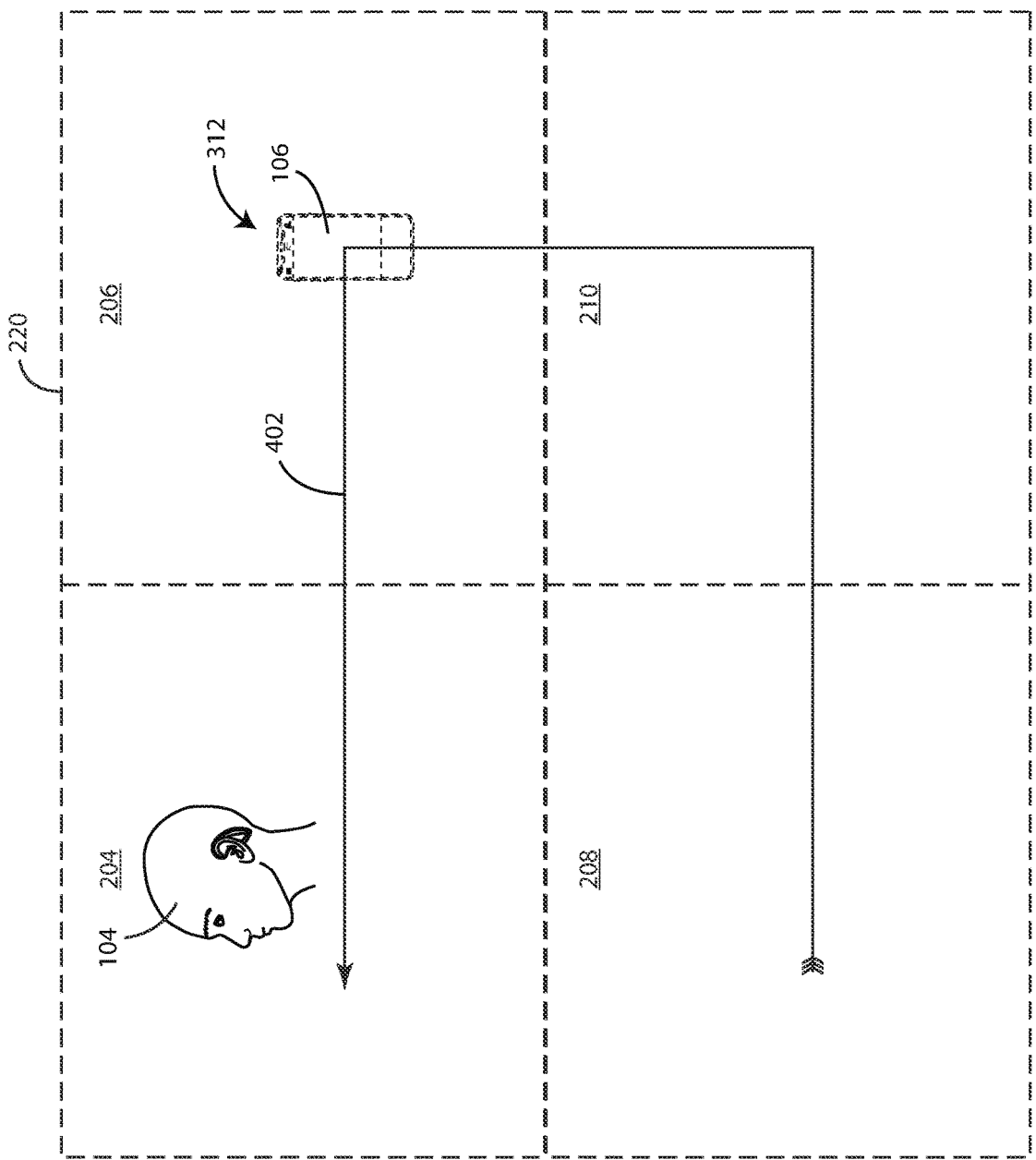
FIG. 4 is a schematic view of a device wearer passing through different areas in accordance with various embodiments herein.

Referring now to FIG. 4, a schematic view of a device wearer passing through different areas is shown in accordance with various embodiments herein. In various embodiments, determination of a projected location 312 of the mobile electronic device 106 includes evaluating recorded movement patterns 402 of the device wearer 104. As with FIG. 2, FIG. 4 shows an area 220. The area 220 includes a first zone 204, second zone 206, third zone 208, and fourth zone 210.

In this particular example, the device wearer 104 started in the third zone 208, then moved to the fourth zone 210, then moved to the second zone 206, and then moved to the first zone 204. However, the last time there was communication between the ear-worn devices and the mobile electronic device 106 was in the second zone 206. Therefore, in this example, the projected location 312 can be in the second zone 206.

In some embodiments, a location of a mobile electronic device can simply be defined in terms of a geospatial location of the mobile electronic device itself, for example coordinates of the mobile electronic device location to which the ear-worn device wearer can be guided. However, in other embodiments, the location of a mobile electronic device can be defined with reference to another device, landmark, locating beacon, distinctive sound field, etc. (e.g., a referential element at a referential location). The location of the referential location can be used to guide the ear-worn device wearer in various ways. For example, if the referential location is believed to be near the mobile electronic device, then the ear-worn device wearer can be guided to the referential location. For example, coordinates of the referential location can be used to guide the ear-worn device wearer in a step-by-step manner. As another example, the referential location may be an area that the ear-worn device wearer is familiar with so they can simply be directed to go to that area without step by step directions (e.g., "go to the master bathroom counter", or "go to your ear-worn device charger", or "your mobile electronic device is near the locating beacon in the living room")

In some embodiments, referential locations can be used to track previous instances where the ear-worn devices were near the mobile electronic device therefore providing a record of past locations of the mobile electronic device. For example, if the last time the ear-worn device(s) were in communication with the mobile electronic device occurred when the ear-worn devices were adjacent a specific locating beacon, then the most recent past location of the mobile electronic device can be assumed to be near the locating beacon. In this way, past locations of the mobile electronic device can be tracked even in the absence of the mobile electronic device emitting locating signals or otherwise broadcasting its location.

Figure 5:
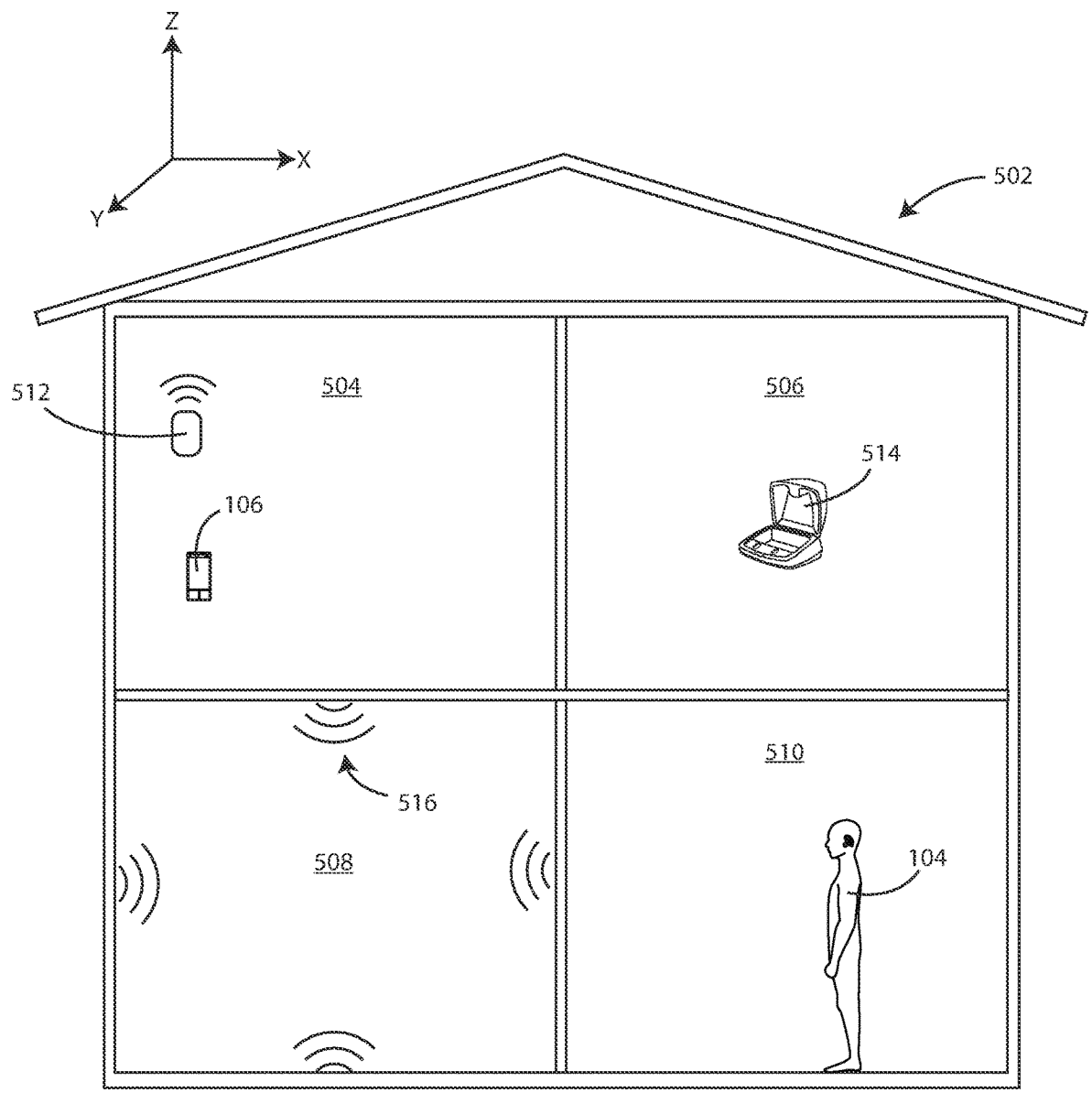
FIG. 5 is a schematic view of an environment with different area in accordance with various embodiments herein.

Referring now to FIG. 5, a schematic view of an environment with different areas including reference elements is shown in accordance with various embodiments herein. The environment includes an environment 502. The environment 502 includes a first room 504, second room 506, third room 508, and fourth room 510. The rooms can be different from one another in one or more of X, Y, and Z coordinates. A mobile electronic device 106 is disposed within the first room 504. Referential elements therein can include a beacon 512 that can be disposed within the first room 504. In various embodiments, the beacon 512 can interface with the ear-worn device(s) and/or the mobile electronic device. The beacon 512 can emit a wireless signal having limited range. The beacon 512 can be placed at a known location. Therefore, detection of the beacon 512 by the ear-worn device(s) and/or the mobile electronic devices is indicative of the same being near the location of the beacon 512. Another referential aspect can include an associated device 514 disposed within a second room 506. The associated device 514 can function similarly to the beacon 512. In some embodiments, the associated device 514 can be, for example, a charger. In some cases, the associated device 514 can interface directly with the ear-worn device(s) and/or the mobile electronic device (such as when charging up such devices).

Another referential aspect can include a recognizable sound field 516 disposed within a third room 508. For example, different rooms within a house may have very different acoustic properties based on various factors including, but not limited to, ceiling height, flooring materials, room size, cabinetry, noise sources, etc. Nuances of such rooms or environments can be detectable by the ear-worn device(s) and/or the mobile electronic device allowing the recognition of the unique sound field to function much like a virtual location beacon.

Figure 6:
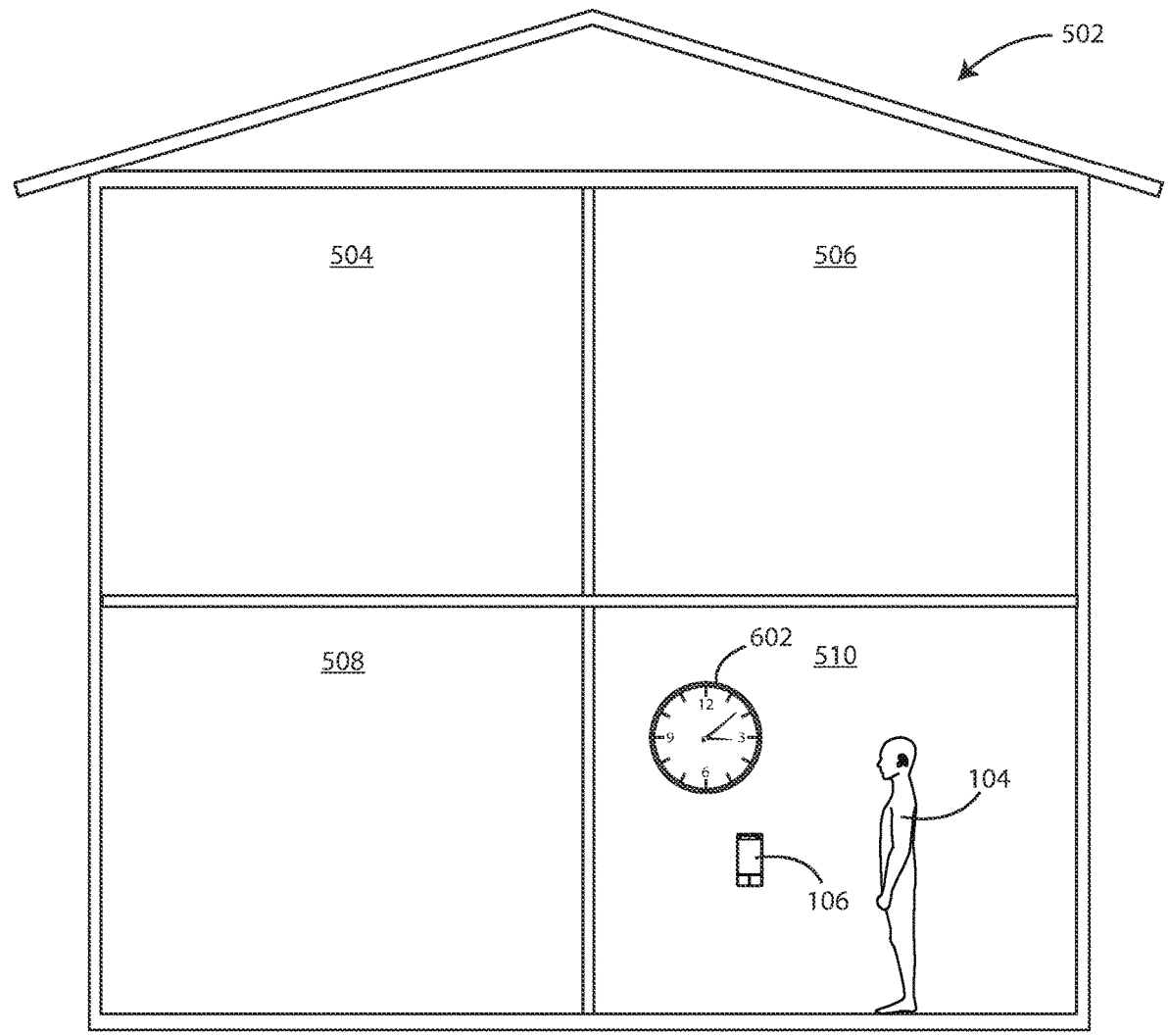
FIG. 6 is a schematic view of an environment with different area in accordance with various embodiments herein.
Figure 7:
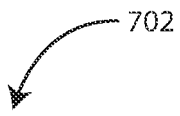
FIG. 7 is a view of a table cross-referencing time and location in accordance with various embodiments herein.

Referring now to FIG. 6, a schematic view of an environment 502 with different areas is shown in accordance with various embodiments herein. The environment 502 includes a first room 504, second room 506, third room 508, and fourth room 510. Movement of the device wearer 104 and/or the ear-worn device(s) and/or the mobile electronic device 106 can be tracked throughout the environment 502. The tracked movement can include a location (specific and/or referential), a time component 602, and the like. As an example, referring now to FIG. 7, a view of a table 702 cross-referencing time and location is shown in accordance with various embodiments herein.

Figure 8:
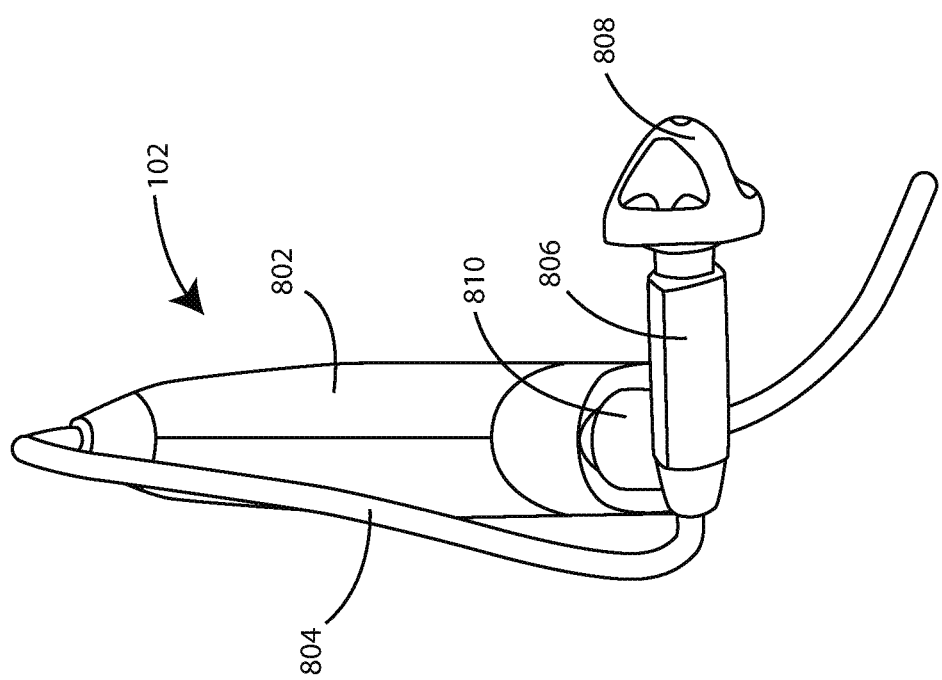
FIG. 8 is a schematic view of an ear-worn device in accordance with various embodiments herein.

Referring now to FIG. 8, a schematic view of an ear-worn device 102 is shown in accordance with various embodiments herein. The ear-worn device 102 can include a hearing device housing 802. The hearing device housing 802 can define a battery compartment 810 into which a battery can be disposed to provide power to the device. The ear-worn device 102 can also include a receiver 806 adjacent to an earbud 808. The receiver 806 an include a component that converts electrical impulses into sound, such as an electroacoustic transducer, speaker, or loud speaker. Such components can be used to generate an audible stimulus in various embodiments herein. A cable 804 or connecting wire can include one or more electrical conductors and provide electrical communication between components inside of the hearing device housing 802 and components inside of the receiver 806.

The ear-worn device 102 shown in FIG. 8 is a receiver-in-canal type device and thus the receiver is designed to be placed within the ear canal. However, it will be appreciated that may different form factors for ear-worn devices are contemplated herein. As such, ear-worn devices herein can include, but are not limited to, behind-the-ear (BTE), in-the ear (ITE), in-the-canal (ITC), invisible-in-canal (ITC), receiver-in-canal (RIC), receiver in-the-ear (RITE) and completely-in-the-canal (CIC) type hearing assistance devices.

The term "ear-worn device" shall also refer to devices that can produce optimized or processed sound for persons with normal hearing. Ear-worn devices herein can include hearing assistance devices. In some embodiments, the ear-worn device can be a hearing aid falling under 21 C.F.R. § 801.420. In another example, the ear-worn device can include one or more Personal Sound Amplification Products (PSAPs). In another example, the ear-worn device can include one or more cochlear implants, cochlear implant magnets, cochlear implant transducers, and cochlear implant processors. In another example, the ear-worn device can include one or more "hearable" devices that provide various types of functionality. In other examples, ear-worn devices can include other types of devices that are wearable in, on, or in the vicinity of the user's ears. In other examples, ear-worn devices can include other types of devices that are implanted or otherwise osseointegrated with the user's skull; wherein the device is able to facilitate stimulation of the wearer's ears via the bone conduction pathway.

Ear-worn devices of the present disclosure can incorporate an antenna arrangement coupled to a radio, such as a 2.4 GHz radio. The radio can conform to an IEEE 802.11 (e.g., WIFI®) or BLUETOOTH® (e.g., BLE, BLUETOOTH® 4.2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

Figure 9:
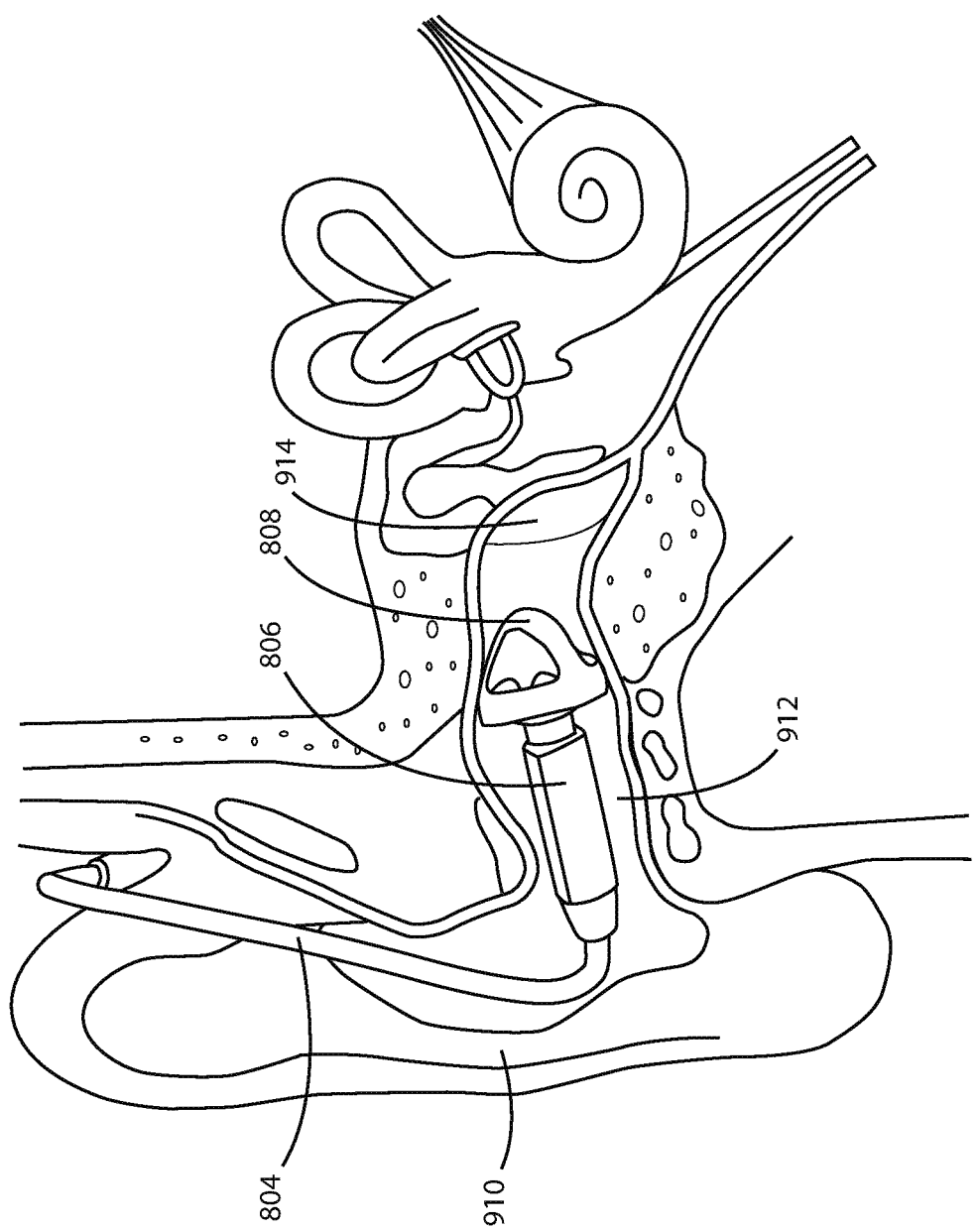
FIG. 9 is a schematic view of an ear-worn device being worn on an ear in accordance with various embodiments herein.

As mentioned above, the ear-worn device 102 shown in FIG. 8 can be a receiver-in-canal type device and thus the receiver is designed to be placed within the ear canal. Referring now to FIG. 9, a schematic view is shown of an ear-worn device 102 disposed within the ear of a subject in accordance with various embodiments herein. In this view, the receiver 806 and the earbud 808 are both within the ear canal 912, but do not directly contact the tympanic membrane 914. The hearing device housing is mostly obscured in this view behind the pinna 910, but it can be seen that the cable 804 passes over the top of the pinna 910 and down to the entrance to the ear canal 912.

Figure 10:
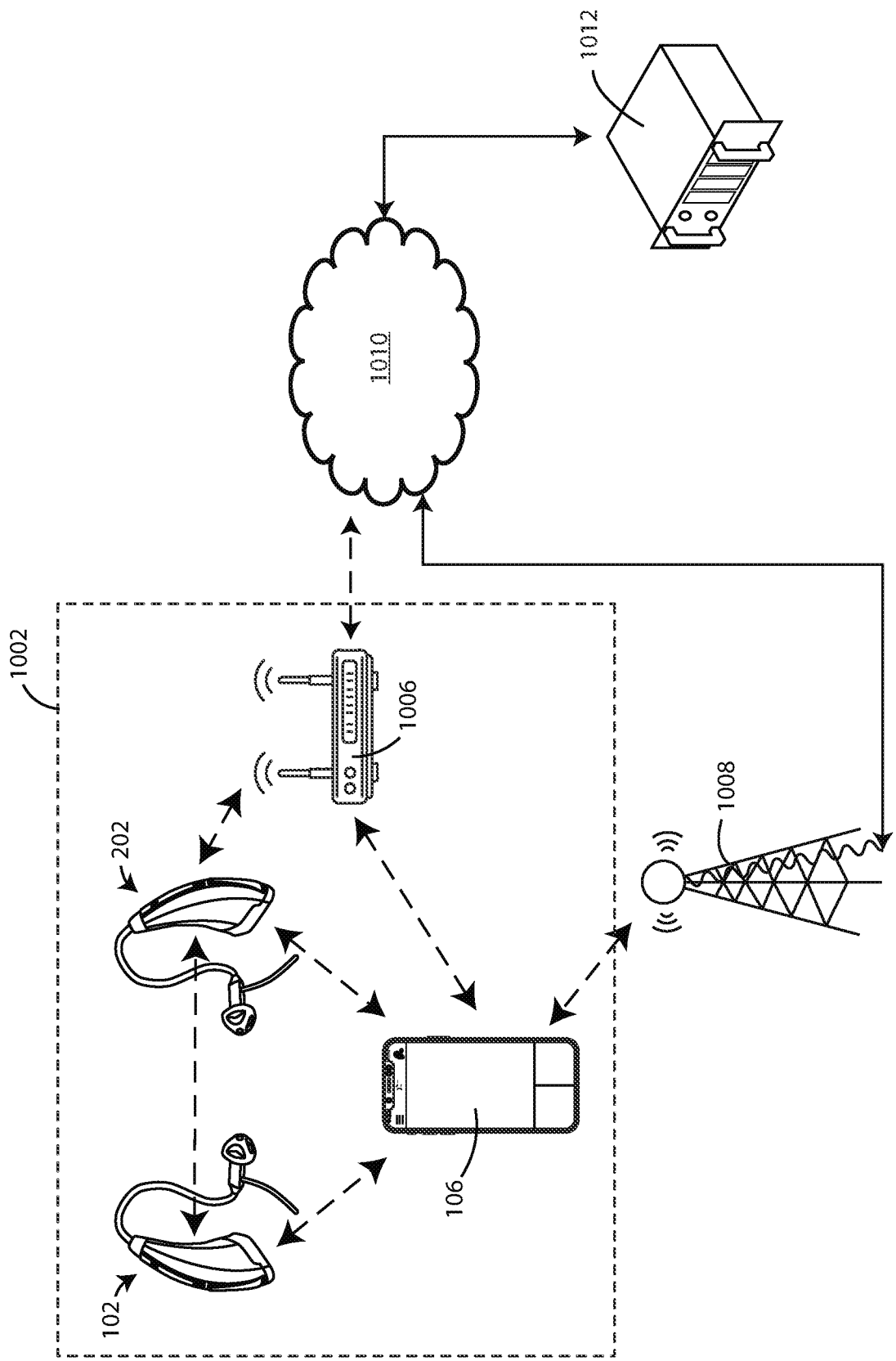
FIG. 10 is a schematic view of a communication network in accordance with various embodiments herein.

In various embodiments herein, data/signals/information can be conveyed to one or more remote locations for processing. Further, data/signals/information can be sent from a remote location to one or more of an ear-worn device and/or a mobile electronic device. Referring now to FIG. 10, a schematic view of a communication network is shown in accordance with various embodiments herein. FIG. 10 shows an ear-worn device 102, a second ear-worn device 202, and a mobile electronic device 106 that are all at a first location 1002. FIG. 10 also shows various data communication equipment such as a router 1006 and a cellular communications tower 1008, which can be used to convey data including audio streams to or from the ear-worn devices 102, 104 and the mobile electronic device 106. The data communication equipment can be used to provide a connection to the cloud 1010 and/or one or more remote servers 1012 (real or virtual and may be part of the cloud). In some embodiments, connections to the cloud and/or remote servers can be used to offload certain processing tasks, such as computing a projected location of the mobile electronic device. In some embodiments, data used to calculate projected locations and/or lookup past locations can be stored in the cloud 1010 and/or on remote servers 1012.

Figure 11:
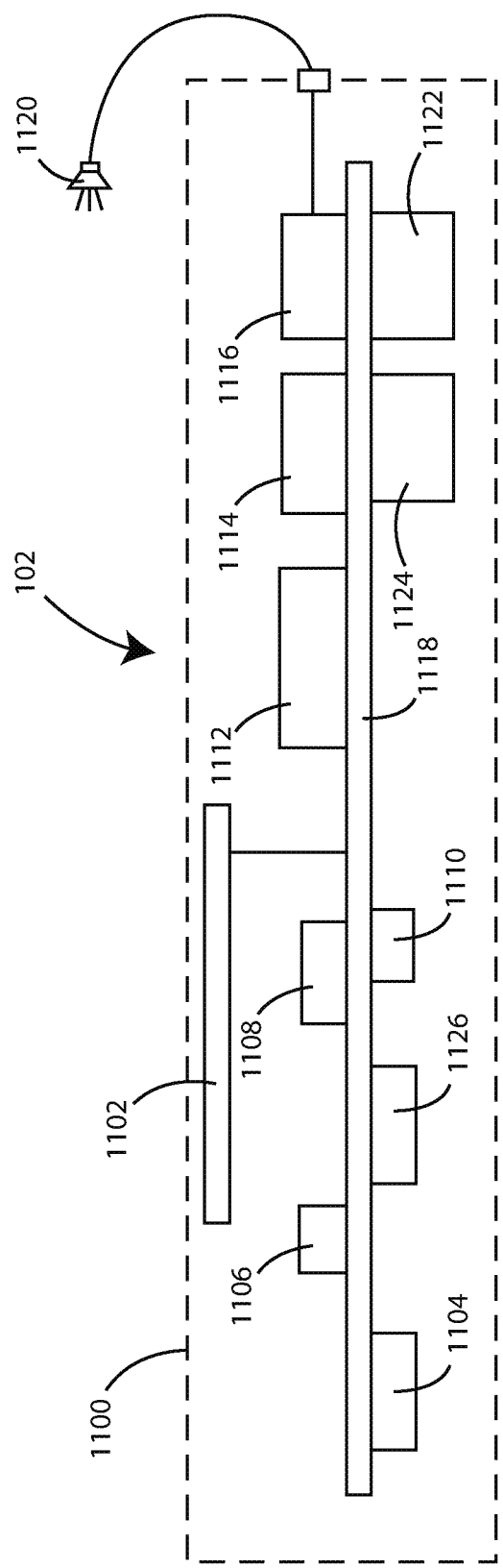
FIG. 11 is a schematic diagram of components of an ear-worn device in accordance with various embodiments herein.

Referring now to FIG. 11, a schematic block diagram of components of an ear-worn device is shown in accordance with various embodiments herein. The block diagram of FIG. 11 represents a generic ear-worn device for purposes of illustration. The ear-worn device 102 shown in FIG. 11 includes several components electrically connected to a flexible mother circuit 1118 (e.g., flexible mother board) which is disposed within housing 1100. A power supply circuit 1104 can include a battery and can be electrically connected to the flexible mother circuit 1118 and provides power to the various components of the ear-worn device 102. One or more microphones 1106 are electrically connected to the flexible mother circuit 1118, which provides electrical communication between the microphones 1106 and a digital signal processor (DSP) 1112. Among other components, the DSP 1112 incorporates or is coupled to audio signal processing circuitry configured to implement various functions described herein. A sensor package 1114 can be coupled to the DSP 1112 via the flexible mother circuit 1118. The sensor package 1114 can include one or more different specific types of sensors such as those described in greater detail below. One or more user switches 1110 (e.g., on/off, volume, mic directional settings) are electrically coupled to the DSP 1112 via the flexible mother circuit 1118.

An audio output device 1116 is electrically connected to the DSP 1112 via the flexible mother circuit 1118. In some embodiments, the audio output device 1116 comprises an electroacoustic transducer or speaker (coupled to an amplifier). In other embodiments, the audio output device 1116 comprises an amplifier coupled to an external receiver 1120 adapted for positioning within an ear of a wearer. The external receiver 1120 can include an electroacoustic transducer, speaker, or loud speaker. The ear-worn device 102 may incorporate a communication device 1108 coupled to the flexible mother circuit 1118 and to an antenna 1102 directly or indirectly via the flexible mother circuit 1118.

The communication device 1108 can be a BLUETOOTH® transceiver, such as a BLE (BLUETOOTH® low energy) transceiver or other transceiver(s) (e.g., an IEEE 802.11 compliant device). The communication device 1108 can be configured to communicate with one or more external devices, such as those discussed previously, in accordance with various embodiments. In various embodiments, the communication device 1108 can be configured to communicate with an external visual display device such as a smart phone, a video display screen, a tablet, a computer, or the like.

In various embodiments, the ear-worn device 102 can also include a control circuit 1122 and a memory storage device 1124. The control circuit 1122 can be in electrical communication with other components of the device. In some embodiments, a clock circuit 1126 can be in electrical communication with the control circuit. The control circuit 1122 can execute various operations, such as those described herein. The control circuit 1122 can include various components including, but not limited to, a microprocessor, a microcontroller, an FPGA (field-programmable gate array) processing device, an ASIC (application specific integrated circuit), or the like. The memory storage device 1124 can include both volatile and non-volatile memory. The memory storage device 1124 can include ROM, RAM, flash memory, EEPROM, SSD devices, NAND chips, and the like. The memory storage device 1124 can be used to store data from sensors as described herein and/or processed data generated using data from sensors as described herein.

It will be appreciated that various of the components described in FIG. 11 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Mobile electronic devices herein can include various different components. In some embodiments, the mobile electronic device can be a personal communications device, such as a smart phone. However, the mobile electronic device can also be other things such as a wearable device, a handheld computing device, a dedicated location determining device (such as a handheld GPS unit), or the like.

Figure 12:
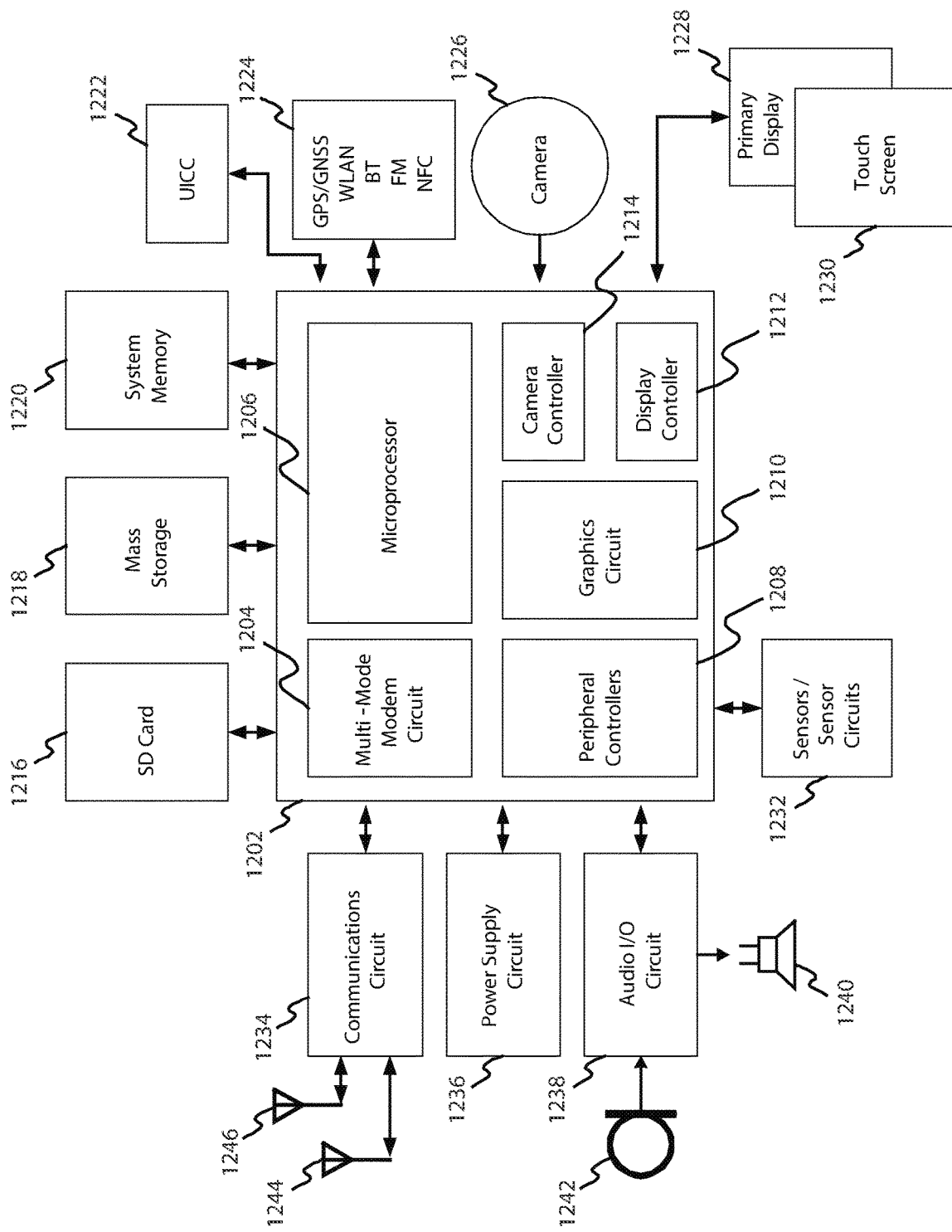
FIG. 12 is schematic diagram of components of a mobile electronic device in accordance with various embodiments herein.

Referring now to FIG. 12, a schematic block diagram is shown of components of a mobile electronic device (which could be a personal communications device or another type of mobile electronic device) in accordance with various embodiments herein. This block diagram is just provided by way of illustration and it will be appreciated that mobile electronic devices can include greater or lesser numbers of components. The mobile electronic device in this example can include a control circuit 1202. The control circuit 1202 can include various components which may or may not be integrated. In various embodiments, the control circuit 1202 can include a microprocessor 1206, which could also be a microcontroller, FPGA, ASIC, or the like. The control circuit 1202 can also include a multi-mode modem circuit 1204 which can provide communications capability via various wired and wireless standards. The control circuit 1202 can include various peripheral controllers 1208. The control circuit 1202 can also include various sensors/sensor circuits 1232. The control circuit 1202 can also include a graphics circuit 1210, a camera controller 1214, and a display controller 1212. In various embodiments, the control circuit 1202 can interface with an SD card 1216, mass storage 1218, and system memory 1220. In various embodiments, the control circuit 1202 can interface with universal integrated circuit card (UICC) 1222. A spatial location determining circuit can be included and can take the form of an integrated circuit 1224 that can include components for receiving signals from GPS, GLONASS, BeiDou, Galileo, SBAS, WLAN, BT, FM, and NFC type protocols. In various embodiments, the mobile electronic device can include a camera 1226. In various embodiments, the control circuit 1202 can interface with a primary display 1228 that can also include a touch screen 1230. In various embodiments, an audio I/O circuit 1238 can interface with the control circuit 1202 as well as a microphone 1242 and a speaker 1240. In various embodiments, a power supply circuit 1236 can interface with the control circuit 1202 and/or various other circuits herein in order to provide power to the system. In various embodiments, a communications circuit 1234 can be in communication with the control circuit 1202 as well as one or more antennas (1244, 1246).

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of locating a mobile electronic device can include issuing a location command to a mobile electronic device using an ear-worn device, waiting to receive a locating signal from the mobile electronic device with the ear-worn device, and guiding a device wearer to a location of the mobile electronic device using the ear-worn device. In an embodiment of the method, the locating signal contains a location of the mobile electronic device. In an embodiment of the method, the location of the mobile electronic device is at least one of a geospatial location, a stored location, or a projected location.

In an embodiment, the method can further include calculating a projected location using at least one of a current time of day, recorded sleep/wake patterns of the device wearer, recorded movement patterns of the device wearer, recorded activity patterns of the device wearer. In an embodiment, the method can further include guiding an ear-worn device wearer to a projected location of the mobile electronic device.

In an embodiment, the method can further include issuing a location command to a secondary device if a locating signal is not received within a time period after issuing a location command to a mobile electronic device.

In an embodiment, the method can further include playing sounds recorded the last time the mobile electronic device was in communication with the ear-worn device if a locating signal is not received with a time period after issuing a location command to a mobile electronic device.

In an embodiment, the method can further include guiding an ear-worn device wearer to the mobile electronic device based on the locating signal. In an embodiment of the method, guiding comprises guiding using a virtual 3-D audio interface.

In an embodiment of the method, guiding comprises providing directions relative to the directional position of the device wearer's head. In an embodiment of the method, guiding includes providing step-by-step directions.

In an embodiment, the method can further include receiving an initiation command from the ear-worn device wearer prior to issuing the location command.

Locating Signal

Various embodiments herein include a locating signal. Further details about the locating signal are provided as follows. However, it will be appreciated that this is merely provided by way of example and that further variations are contemplated herein. The locating signal can be emitted from the mobile electronic device in order for it to be located.

In some cases, the locating signal can be designed to be received directly by the ear-worn device wearer. In other cases, the locating signal can be designed to be received by the ear-worn devices or another device. For example, in some embodiments, the locating signal can include a sound at an audible frequency (e.g., 20 to 20,000 Hz). In various embodiments, the locating signal can include a sound at an inaudible frequency (e.g., <20 or >20,000 Hz). In various embodiments, the locating signal can include a visual output, such as a flashing light. In various embodiments, the locating signal can include a vibration.

In various embodiments, the locating signal can include a geospatial location bearing electronic communication. In various embodiments, the geospatial location is a current geospatial location of the mobile electronic device. In various embodiments, the geospatial location can include geospatial coordinates. In various embodiments, the locating signal can include horizontal and/or vertical dimensions. In various embodiments, the geospatial location can include X, Y, and Z axis components.

In various embodiments, the geospatial location can include a triangulated location. For example, the location can be derived using a triangulation technique relative to known transmitters. In various embodiments, the locating signal can include a referential location. In various embodiments, the referential location can include a beacon reference. In various embodiments, the referential location can include a specific room. In various embodiments, the referential location can include an associated device reference. In various embodiments, the referential location can include a recognized sound field reference In various embodiments, the ear-worn device is configured to access a stored location of the mobile electronic device if a locating signal is not received with a time period after issuing a location command to a mobile electronic device In various embodiments, the ear-worn device is configured to compute a projected location of the mobile electronic device if a locating signal is not received after issuing a location command to a mobile electronic device In various embodiments, the ear-worn device is configured to play sounds recorded the last time the mobile electronic device was in communication with the ear-worn device if a locating signal is not received with a time period after issuing a location command to a mobile electronic device
User Guidance Various embodiments herein include user guidance. Further details about the user guidance are provided as follows. However, it will be appreciated that this is merely provided by way of example and that further variations are contemplated herein.

In various embodiments, the ear-worn device is configured to guide an ear-worn device wearer to the mobile electronic device based on the locating signal. In some embodiments, this can include determining a present location of the device-wearer and then calculating a route for the device-wearer to follow to get to the location of the mobile electronic device (the actual location, previous location, projected location, or the like). In some cases, the ear-worn device itself may include components for receiving signals from GPS, GLONASS, BeiDou, Galileo, SBAS, WLAN, BT, FM, and NFC type protocols to determine location. In some embodiments, the ear-worn device can determine its location by reference to another device such as a locating beacon or recognizing a known unique sound field. Route calculation can be performed in various ways. In some embodiments route calculation can be performed by submitting the present location of the ear-worn device (and therefore the present location of the device wearer) along with the location of the mobile electronic device (the actual location, previous location, projected location, or the like) to a route calculation API. In some embodiments route calculation can be performed by simply comparing the present location of the ear-worn device (and therefore the present location of the device wearer) and the location of the mobile electronic device (the actual location, previous location, projected location, or the like) and then determining a bearing and distance required to move from one to the other.

In various embodiments, the ear-worn device is configured to guide the ear-worn device wearer using a virtual 3-D audio interface. In some embodiments, the spatialized 3-D virtual sound can be generated so as to be perceived by the wearer as emanating from a particular location, such as the location of the mobile electronic device and/or the location of the next step in guiding the device wearer to the location of the mobile electronic device. The sound generated at the virtual spatial locations can be any broadband sound, such as complex tones, noise bursts, human speech, music, etc. or a combination of these and other types of sound. Further aspects of virtual 3-D audio interfaces are described in commonly owned U.S. patent application Ser. No. 15/589, 298, titled "Hearing Assistance Device Incorporating Virtual Audio Interface for Therapy Guidance", the content of which is herein incorporated by reference in its entirety.

In various embodiments, the ear-worn device can be configured to guide the ear-worn device wearer including directions relative to the directional position of the device wearer's head. First, the ear-worn device can detect a current orientation of the device wearer's head. Then, instructions can be provided relative to that orientation. For example, an ear-worn device can provide an instruction, such as "turn 45 degrees right and move ahead about 5 feet" or "move straight ahead about 10 feet". In various embodiments, the ear-worn device can be configured to guide the ear-worn device wearer including providing step-by-step directions. For example, the ear-worn device can issue a series of directions such as "go forward 8 feet, then turn right 90 degrees, then go forward 5 feet and look down".

In various embodiments, guidance can be provided by reference to known locations or landmarks that are at or near the location of the mobile electronic device (the actual location, previous location, projected location, or the like). For example, after comparing the location of the mobile electronic device to a list of known locations or landmarks, the ear-worn device can select the closest one and then instruct the device wearer to go to that one (e.g., "go to the kitchen", or "your mobile electronic device is in the kitchen, go there").

In various embodiments, guidance can change based on proximity to the mobile electronic device. For example, guidance changes include one or more of pitch changes, volume changes, and frequency of modulation changes.
Projected Locations In various embodiments herein, the system can calculate or otherwise determine a projected location of the mobile electronic device. For example, in various embodiments, the ear-worn device can be configured to compute a projected location of the mobile electronic device if a locating signal is not received after issuing a location command to a mobile electronic device. Various pieces of data can be used in calculating a projected location including, but not limited to, past (saved) locations of the mobile electronic device at different times, temporospatial patterns of the device wearer, movement patterns of the device-wearer, activity/behavior patterns of the device wearer, recorded sleep/wake patterns of the device-wearer, and the like.

As a simple example of determining a projected location, if a mobile electronic device has been recorded to be at a certain location one weekdays at a specific time, then the projected location of the mobile electronic device on a weekday at that time can be the certain location. As another simple example of determining a projected location, if location patterns indicate that a daily pattern of mobile electronic device locations includes "location A", followed by "location B", followed by "location C", and if it is known that the last place the mobile electronic device was recorded to be was in "location B" and it is no longer there, then the projected location can be determined to be "location C".

More complex patterns can be identified and applied using various techniques including, but not limited to, machine learning. More specifically, in various embodiments, projected location analysis can be performed using a support vector machine (SVM) approach, a linear discriminant analysis (LDA) model, a multiple kernel learning (MKL) approach, or a deep neural network approach to develop a model or algorithm used to calculate a projected location of a mobile electronic device. The model or algorithm can be updated periodically. In some embodiments, the system can apply various machine learning techniques and/or models representing outputs of the same to the various pieces of data to determine a probability that the mobile electronic device is located in a given location. The location with the highest probability can be designated as the projected location. Machine learning techniques can be improved, over time, through application of supervised learning techniques, such as prompting the user to indicate whether or not the mobile electronic device was actually in the projected location.

Sensors

Ear-worn devices herein can include one or more sensor packages (including one or more discrete or integrated sensors) to provide data. The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. The IMU can be of a type disclosed in commonly owned U.S. patent application Ser. No. 15/331,230, filed Oct. 21, 2016, which is incorporated herein by reference. In some embodiments, electromagnetic communication radios or electromagnetic field sensors (e.g., telecoil, NFMI, TMR, GME, etc.) sensors may be used to detect motion or changes in position. In some embodiments, biometric sensors may be used to detect body motions or physical activity. Motion sensors can be used to track movement of a patient in accordance with various embodiments herein.

In some embodiments, the motion sensor(s) can be disposed in a fixed position with respect to the head of a patient, such as worn on or near the head or ears. In some embodiments, the operatively connected motion sensors can be worn on or near another part of the body such as on a wrist, arm, or leg of the patient.

According to various embodiments, the sensor package can include one or more of a motion sensor, (e.g., IMU, and accelerometer (3, 6, or 9 axis), a gyroscope, a barometer, an altimeter, a magnetometer, a magnetic sensor, an eye movement sensor, a pressure sensor), an acoustic sensor, a telecoil, a heart rate sensor, a global positioning system (GPS), a barometer, a temperature sensor, a blood pressure sensor, an oxygen saturation sensor, an optical sensor, a blood glucose sensor (optical or otherwise), a galvanic skin response sensor, a cortisol level sensor (optical or otherwise), a microphone, acoustic sensor, an electrocardiogram (ECG) sensor, electroencephalography (EEG) sensor which can be a neurological sensor, eye movement sensor (e.g., electrooculogram (EOG) sensor), myographic potential electrode sensor (EMG), a heart rate monitor, a pulse oximeter, a wireless radio antenna, blood perfusion sensor, hydrometer, sweat sensor, cerumen sensor, air quality sensor, pupillometry sensor, cortisol level sensor, hematocrit sensor, light sensor, image sensor, and the like.

In some embodiments, the sensor package can be part of an ear-worn device. However, in some embodiments, the sensor packages can include one or more additional sensors that are external to an ear-worn device. For example, various of the sensors described above can be part of a wrist-worn or ankle-worn sensor package, or a sensor package supported by a chest strap.

Data produced by the sensor(s) of the sensor package can be operated on by a processor or control circuit of the device or system.

As used herein the term "inertial measurement unit" or "IMU" shall refer to an electronic device that can generate signals related to a body's specific force and/or angular rate. IMUs herein can include one or more accelerometers and gyroscopes (3, 6, or 9 axis) to detect linear acceleration and a gyroscope to detect rotational rate. In some embodiments, an IMU can also include a magnetometer to detect a magnetic field.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor (such as a blood oximetry sensor) can be, for example, an optical sensor, an infrared sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential.

It will be appreciated that the sensor package can include one or more sensors that are external to the ear-worn device. In addition to the external sensors discussed hereinabove, the sensor package can comprise a network of body sensors (such as those listed above) that sense movement of a multiplicity of body parts (e.g., arms, legs, torso). In some embodiments, the ear-worn device can be in electronic communication with the sensors or processor of a medical device (implantable, wearable, external, etc.).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed are:

1. An ear-worn device comprising:
a control circuit;
a microphone in electrical communication with the control circuit;
an electroacoustic transducer for generating sound in electrical communication with the control circuit;
a communication device in electrical communication with the control circuit;
a motion sensor in electrical communication with the control circuit;
a power supply circuit in electrical communication with the control circuit;
wherein the ear-worn device is configured to
issue a location command to a mobile electronic device, wherein the location command triggers the mobile electronic device to emit a locating signal; and
guide an ear-worn device wearer to the mobile electronic device based on the locating signal.

2. The ear-worn device of claim 1, the locating signal comprising at least one selected from the group consisting of a sound at an audible frequency, sound at an inaudible frequency, a visual output, a vibration, a geospatial location bearing electronic communication, and a referential location.

3. The ear-worn device of claim 2, the geospatial location comprising geospatial coordinates.

4. The ear-worn device of claim 2, the geospatial location comprising a triangulated location.

5. The ear-worn device of claim 2, the referential location comprising at least one selected from the group consisting of a beacon reference, a specific room, an associated device reference, and a recognized sound field reference.

6. The ear-worn device of claim 1, the locating signal comprising a vertical dimension.

7. The ear-worn device of claim 1, wherein the ear-worn device is configured to guide the ear-worn device wearer using a virtual 3-D audio interface.

8. The ear-worn device of claim 1, wherein the ear-worn device is configured to guide the ear-worn device wearer including directions relative to a directional position of the ear-worn device wearer's head.

9. The ear-worn device of claim 1, wherein guidance changes based on proximity to the mobile electronic device.

10. The ear-worn device of claim 1, wherein the ear-worn device is configured to guide an ear-worn device wearer to a projected location of the mobile electronic device based on a stored location of the mobile electronic device stored in a memory of the ear-worn device.

11. The ear-worn device of claim 1, wherein the ear-worn device is configured to access a stored location of the mobile electronic device if a locating signal is not received with a time period after issuing a location command to a mobile electronic device.

12. The ear-worn device of claim 11, wherein the ear-worn device is configured to periodically receive locating signals from the mobile electronic device and store location aspects of the same.

13. The ear-worn device of claim 1, wherein the ear-worn device is configured to compute a projected location of the mobile electronic device if a locating signal is not received after issuing a location command to a mobile electronic device.

14. The ear-worn device of claim 13, the projected location determined based on factors including a current time of day.

15. The ear-worn device of claim 13, the projected location determined based on factors including recorded sleep/wake patterns of the ear-worn device wearer.

16. The ear-worn device of claim 13, the projected location determined based on factors including recorded movement patterns of the ear-worn device wearer.

17. The ear-worn device of claim 13, the projected location determined based on factors including recorded activity patterns of the ear-worn device wearer.

18. The ear-worn device of claim 1, wherein the ear-worn device is configured to issue a location command to a secondary device if a locating signal is not received within a time period after issuing a location command to a mobile electronic device.

19. An ear-worn device comprising:
a control circuit;
a microphone in electrical communication with the control circuit;
an electroacoustic transducer for generating sound in electrical communication with the control circuit;

a communication device in electrical communication with the control circuit;
a motion sensor in electrical communication with the control circuit;
a power supply circuit in electrical communication with the control circuit;
wherein the ear-worn device is configured to
   issue a location command to a mobile electronic device, wherein the location command triggers the mobile electronic device to emit a locating signal; and
   access a stored location of the mobile electronic device if a locating signal is not received with a time period after issuing a location command to a mobile electronic device.

20. An ear-worn device comprising:
a control circuit;
a microphone in electrical communication with the control circuit;
an electroacoustic transducer for generating sound in electrical communication with the control circuit;
a communication device in electrical communication with the control circuit;
a motion sensor in electrical communication with the control circuit;
a power supply circuit in electrical communication with the control circuit;
wherein the ear-worn device is configured to
issue a location command to a mobile electronic device, wherein the location command triggers the mobile electronic device to emit a locating signal; and
compute a projected location of the mobile electronic device if a locating signal is not received after issuing a location command to a mobile electronic device.

* * * * *